(12) United States Patent
Adams et al.

(10) Patent No.: US 6,186,882 B1
(45) Date of Patent: Feb. 13, 2001

(54) ANIMAL FIELD DRESSING HANGER

(76) Inventors: Terry G. Adams, 1673 McKendree Church Rd., Lawrenceville, GA (US) 30045; David W. Parham, 141 W. Main, Gibson, GA (US) 30810

( * ) Notice: Under 35 U.S.C. 154(b), the term of this patent shall be extended for 0 days.

(21) Appl. No.: 09/461,141

(22) Filed: Dec. 13, 1999

(51) Int. Cl.[7] .................................................. A22B 1/00
(52) U.S. Cl. ............................................ 452/189; 452/192
(58) Field of Search .................................. 452/189, 187, 452/192

(56) References Cited

U.S. PATENT DOCUMENTS

| | | |
|---|---|---|
| D. 345,780 | 4/1994 | Ream . |
| 1,030,683 | 6/1912 | Roskopf . |
| 1,085,439 | 1/1914 | Knudson . |
| 1,148,393 | 7/1915 | McGrath . |
| 1,311,779 | 7/1919 | Shank . |
| 1,603,913 * | 10/1926 | Gillitzer ................. 452/189 |
| 2,411,856 * | 12/1946 | Harding ................. 452/192 |
| 2,809,069 * | 10/1957 | Neel ...................... 452/189 |
| 4,763,942 | 8/1988 | Lyon . |
| 4,909,555 | 3/1990 | Blasi . |
| 5,145,224 | 9/1992 | Welk . |
| 5,263,675 | 11/1993 | Roberts et al. . |
| 5,360,368 | 11/1994 | Hajek . |
| 5,591,077 | 1/1997 | Rowe . |

* cited by examiner

Primary Examiner—Willis Little
(74) Attorney, Agent, or Firm—Hinkle & Associates, P.C.

(57) ABSTRACT

An animal gambrel apparatus having a three piece telescoping spreader bar. The center section of the spreader bar has a telescoping section engaged in each end of the center section, and each end of the center section has an internally mounted retention member that cooperates with an externally mounted stop member on the proximal end of each telescoping section to prevent the telescoping sections from being dislodged from the center section. A locking mechanism is attached to the proximal end of one of the telescoping sections to bias and selectively lock and maintain the sections of the spreader bar in an extended condition. The extended condition is released by turning the spreader bar upside down to disengage the locking mechanism.

8 Claims, 2 Drawing Sheets

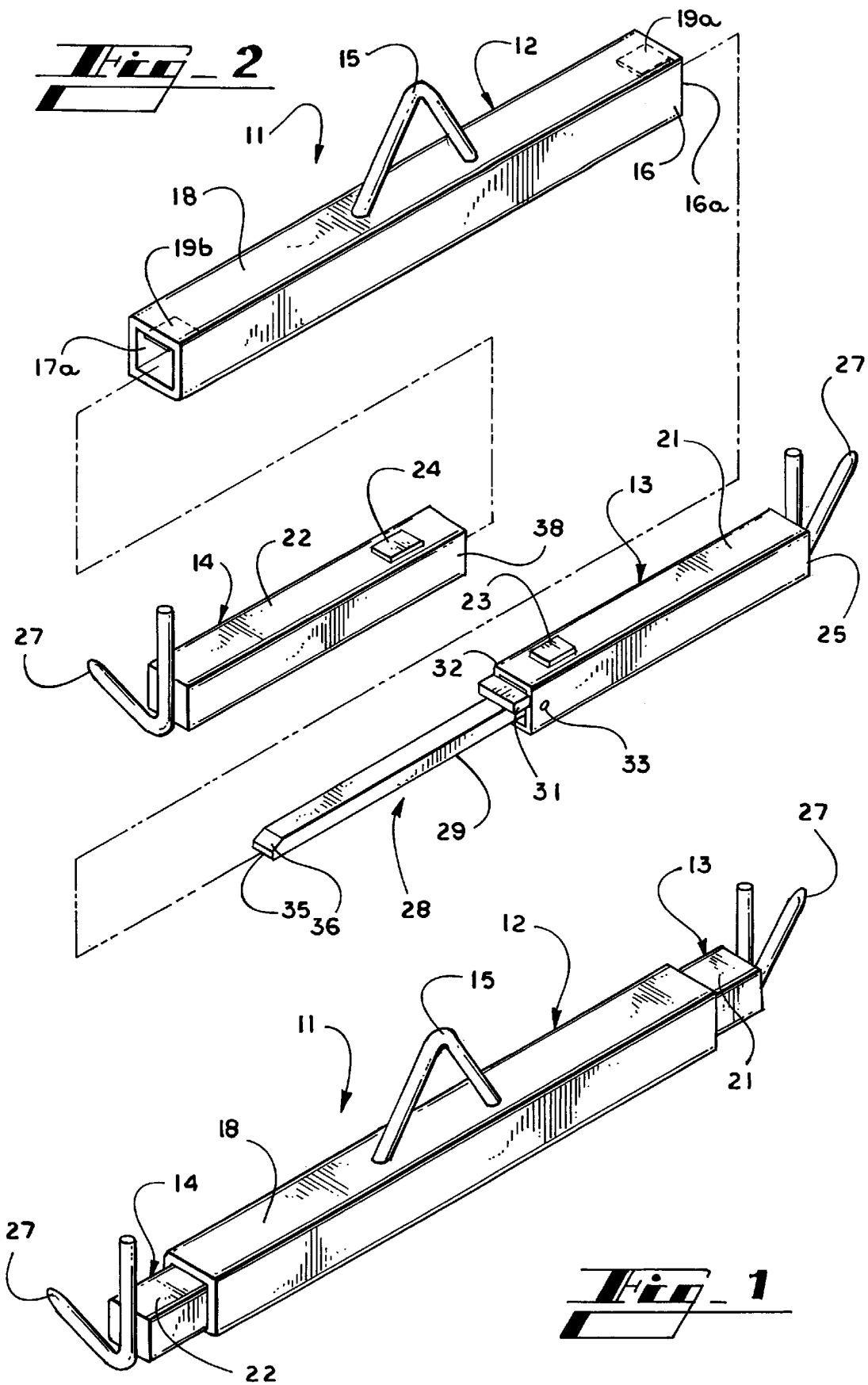

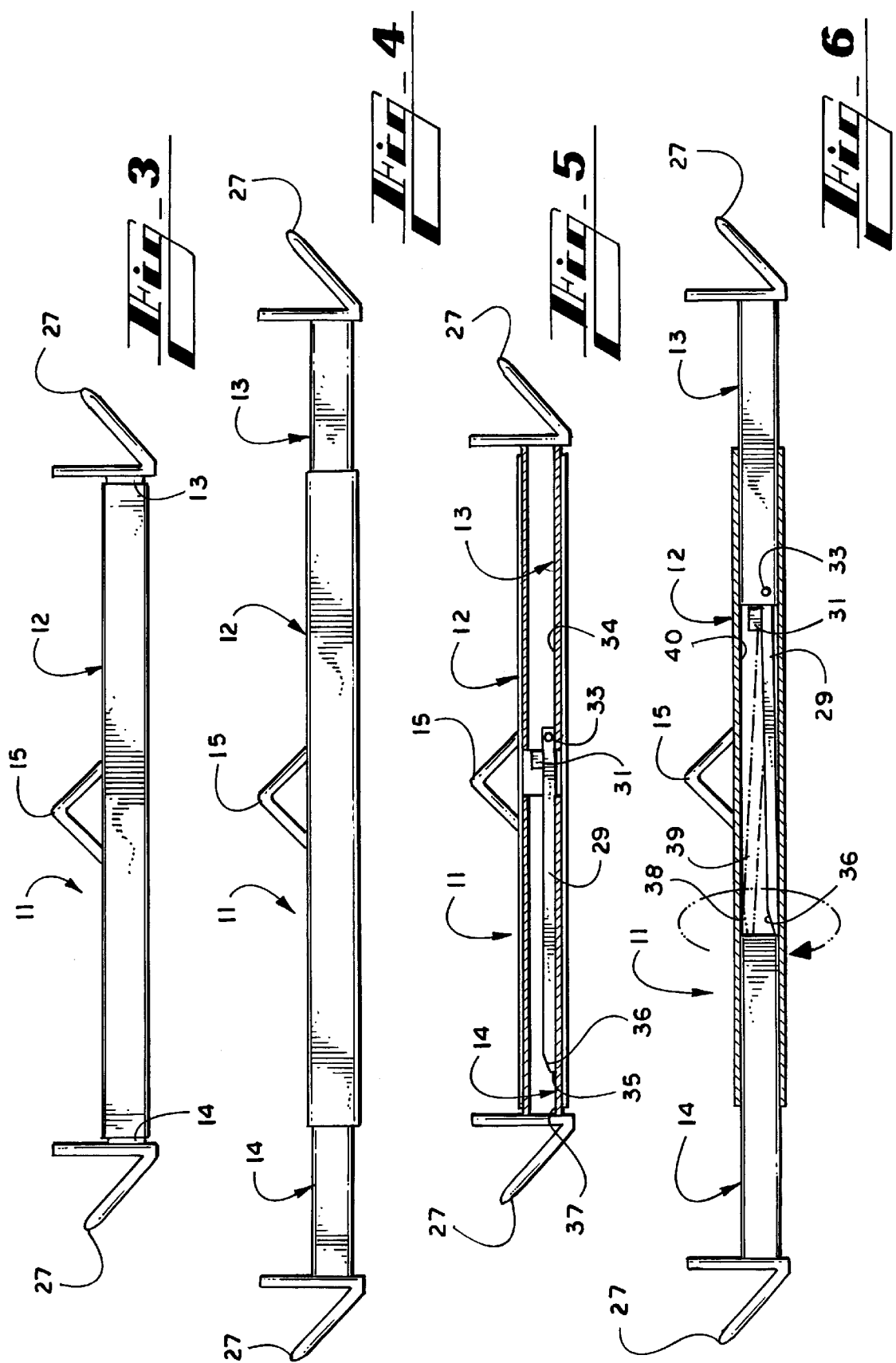

ANIMAL FIELD DRESSING HANGER

BACKGROUND OF THE INVENTION

I. Field of the Invention

The present invention relates generally to devices commonly known as gambrels, and more particularly to gambrels which are simple in construction for suspending the carcasses of slaughtered animals especially in a field dressing environment.

II. Description of the Related Art

Typically, devices to which this invention pertains are widely used in the hunting environment and in slaughter houses, but more particularly are used by hunters for hanging a slaughtered game animal in order to support the carcass when field dressing the carcass. In addition, gambrels, such as disclosed herein, are further utilized for supporting an animal in a hanging position to retain and preserve the animal at later stages of the processing.

There are many gambrel devices known in the prior art, however, most of them are complex, have many parts which are easily lost, are heavy to transport by one person through the woods for an extended period of time, and are not simple in use.

The practical gambrel device should be one which is easily folded into a compact assembly with relative ease of assembly and disassembly, for convenience of storage and transportation and is easy to use. In addition, such a gambrel device should also be of simple design without having multiple parts which are easily lost or misplaced in the hunting environment.

A typical device of the prior art is the patent to Roskopf (U.S. Pat. No. 1,030,683) which discloses a telescoping type device having a hanger hook connected to a center portion into which one fixed portion is placed at one end thereof, and at the other end of the center portion there is a telescoping member which is capable of telescoping into the unit for compact storage. However, in this particular device, the system of fixing the gambrel at the extended position, or at the closed position, requires relatively small parts to be utilized which again are easily lost in the field.

In the Knudson patent (U.S. Pat. No. 1,085,439) a telescoping gambrel is shown which is capable of being folded due to the heavy gauge wire construction, but, again, the device does not have a convenient method of opening and closing and utilizes, again, small parts which are easily lost in the field.

The patent to Shank (U.S. Pat. No. 1,311,779) discloses a type of gambrel which is adjustable and apparently can be reduced in size for easier transportation, but the method of maintaining the arms of the gambrel in an extended condition leaves much to be desired from a standpoint of strength.

The gambrel shown in the patent to McGrath (U.S. Pat. No. 1,148,393) is a tubular telescoping type device, but is of complex construction and is of such a heavy weight that it would be impractical for field use.

Another tubular type of collapsible telescoping gambrel is shown in the patent to Blasi (U.S. Pat. No. 4,909,555) and, again, such device as shown herein is of considerable weight and has many parts therein for maintaining the tube in an extended position which makes it impractical for field use.

SUMMARY OF THE INVENTION

In accordance with the present invention and the contemplated problems which have and continue to exist in this field, the objectives of this invention are to provide a gambrel which is strong, rugged, easily transportable and is of simple construction which can be telescoped for compact storage, yet can be telescopingly extended in length to fit a variety of animals. There are no accessory parts to adjust or to lose with the present invention and the invention is totally self-contained. One feature of the invention is that the telescoping arms of the gambrel, once extended, are positively locked in an extended position without the user having to adjust any other part. Once the device is to be secured and stored, the user merely has to turn the gambrel to an upside down position from the use position and the locking mechanism automatically disengages allowing the user to quickly collapse and store the gambrel.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 is an overall perspective view of the gambrel;

FIG. 2 is an exploded perspective view;

FIG. 3 is a front elevation view showing the gambrel fully collapsed;

FIG. 4 is a front elevation view showing the gambrel in an extended condition;

FIG. 5 is a longitudinal, vertical section view showing the locking mechanism in an unlocked collapsed condition; and FIG. 6 is a longitudinal vertical section view showing the locking mechanism locking the gambrel in an extended condition, and further showing the procedure of rotating the gambrel a half turn to unlock the locking mechanism, thereby allowing the gambrel to be moved to a collapsed condition.

DESCRIPTION OF THE PREFERRED EMBODIMENT

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIGS. 1 and 2. The field dressing gambrel of the present invention is generally indicated by the numeral 11, wherein the gambrel comprises a center section 12, a first telescoping section 13 and a second telescoping section 14. The center section 12 generally has a configuration of an elongated rectangular shaped member, however, it is contemplated in this invention that the rectangular shape of the center section 12 could easily be tubular or any other convenient shape which would offer the strength and stability that is necessary for the activities to which the invention will be put. Centrally mounted on the center section 12 is a hanger 15 for the purpose of hanging the gambrel 11 to a support for holding the gambrel and the carcass of the slaughtered animal at desired times. Typically, the hanger 15 would be of suitable heavy gauge steel tubing and would be welded centrally on the center section 12. The center section 12 has a first distal end 16 and a second distal end 17, which ends define a respective telescoping accesses 16a and 17a. The center section 12 and the telescoping sections 13 and 14 are generally referred to as the spreader bar.

The center section 12 has an upper surface 18 which is the surface to which hanger 15 is mounted. Underneath the upper surface 18, and within the respective telescoping accesses 16a and 17a, mounted to the undersurface of the upper surface 18 are retention members 19a and 19b. The need for these retention members will become apparent in the description below. However, it should be noted that the retention members 19a and 19b are mounted within the center section 12 only upon the final fabrication of the gambrel 11.

As noted, the telescoping sections 13 and 14 are placed in the respective distal ends 16 and 17 of the center section by merely telescoping the box sections into the center section. Each of the telescoping sections are essentially mirror images of one another with the exception of a locking mechanism which will be later described. Each telescoping section will be of a mating configuration to the center section 12 so that each center section will slide into the respective telescoping access openings 16a and 17a. Mounted upon the upper surface 21 of the first telescoping section 13 at the proximal end thereof, and upon the upper surface 22 of the proximal end of second telescoping section 14, there are respective stop members 23 and 24. At the distal end 25 of the first telescoping section and at the distal end 26 of the second telescoping section, are substantially identical hooks 27 which are typically welded to the respective distal ends of each telescoping section. As noted in the drawings, the hooks 27 are substantially of a V shape. However, it is contemplated that the hooks could be of any suitable other configuration such as in the shape of a letter J. When the telescoping sections 13 and 14 are telescopingly engaged with the respective telescoping accesses 16a and 17a, the fabrication of the gambrel must be completed by affixing, most suitably by welding, the respective retention members 19a and 19b to the underside of the upper surface 18 of the center section 12. In this way, the telescoping sections 13 and 14 will then be prevented from being withdrawn from the center section by the interaction of respective retention member 19a with stop member 23, and the retention member 19b with stop member 24. It is obvious from the drawings that the telescoping sections will be prevented from sliding out of the center section when the stop members 23 and 24 bear against the respective retention members 19a and 19b.

Turning now especially to FIGS. 1, 5 and 6, the locking mechanism 28 maintains the telescoping sections in an extended position at desired times. The locking mechanism 28 comprises the locking rod 29 which has a limit stop 31 affixed to the proximal end of the locking rod. The locking rod 29 is affixed to the proximal end 32 of the first telescoping section 13 by means of a through pivot pin 33 which projects through the side walls of the first telescoping section, and through a mating hole within the proximal end of the locking rod 29. The locking rod 29 is freely pivotable around the pivot pin 33, but its movement is confined within a range from being parallel to the inside bottom surface 34 of the first telescoping section upwardly to a point where the limit stop 31 prevents further upward movement when the limit stop positions itself against the proximal end 32 of the first telescoping section. The locking rod 29 is an elongated, preferably steel, bar which has a rod tip 35 and a release slant 36 built into the end of the tip 35. In a normal closed collapsed position as shown in FIG. 5, the locking rod will rest upon the bottom inside surface 36 of the second telescoping section 14.

When it is desired by the user to extend the telescoping sections to the full extent thereof for use in field dressing of an animal, the user will reciprocate both telescoping sections fully outwardly until the respective stop members 23 and 24 bear against the respective retention members 19a and 19b. At this point, the gambrel has been extended to a condition shown in FIG. 6 and is in the fully extended and locked condition. In this position, the locking rod 29 rests on the lower surface 37 of center section 12 and the locking rod tip 35 bears against the lower portion of proximal end 38 of the second telescoping section. In this way, as long as the gambrel is maintained in its normal operating position, that is when the hanger 15 is in the upward position being held by a securing device of suitable design, the locking rod 29 will remain in the locking position as shown in FIG. 6.

When the user has completed the field dressing procedure and it is desired to collapse and store the gambrel, or at such time after the gambrel has been fully cleaned and ready for storage, in order to collapse the telescoping sections 13 and 14 into the center section 12, it will be necessary to reciprocate each of them to the closed position.

Therefore, to effect closure of the gambrel from the extended position to a collapsed condition, it is only necessary to dislodge locking rod tip 35 from its position at the proximal end 38 of telescoping section 14. In order to do this, the user, as shown in FIG. 6, merely has to rotate the gambrel 11 around its longitudinal axis 180° to move the upper surface 18 from a vertical position to a downwardly facing position. When this is accomplished, the locking rod 29 will fall out of engagement with the proximal end 38 and fall to a position as shown by the dotted line 39 of FIG. 6. It should be noted that FIG. 6 shows the gambrel in its operative configuration with the upper surface 18 in the upward operative direction. However, the reader hereof will understand that when the gambrel is rotated around its longitudinal axis 180° the entire unit will be upside down with respect to the view of FIG. 6, and the weight of the locking rod 29 will cause it to fall to a position touching the underside 40 of the upper surface 18. When this is accomplished, then the proximal end 58 of telescoping section 14 will pass under slant 36 and will be free to telescope into center section 12 and pass locking rod tip 35, and continue reciprocating along with first telescoping section 13 to a fully closed collapsed position.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A collapsible animal gambrel comprising:
    an elongated hollow center section having a first distal end and a second distal end, the hollow center section having an interior wall surface and an exterior wall surface,
    a first telescoping end section having a proximal end and a distal end,
    a second telescoping end section having a proximal end and a distal end,
    the first distal end of the center section receiving the proximal end of the first end section in telescoping relationship,
    the second distal end of the center section receiving the proximal end of the second end section in telescoping relationship,
    the first telescoping end section and the second telescoping end section having selectively engaging locking means to lock the first telescoping end section and the second telescoping end section in an open telescoped condition with respect to the center section, and the locking means comprises an elongated locking rod pivotally attached to the proximal end of one of the telescoping end sections, the locking rod selectively engaging the proximal end of the other telescoping end section to lock the telescoping end sections in an open telescoped condition.

2. A collapsible animal gambrel as claimed in claim 1, wherein the locking rod has a distal end, the distal end having a substantially flat tip portion, the locking rod being moveably mounted about a pivot shaft mounted in the proximal end of the first telescoping section, the locking rod having a release slant portion extending from the tip to an intermediate area between the tip and locking rod pivot shaft.

3. A collapsible animal gambrel as claimed in claim 1, wherein a portion of the interior wall surface of the hollow center section at each distal end thereof has a retention member mounted to the interior wall surface, each proximal end of each of the telescoping end sections have a stop member mounted to the exterior wall surface thereof for cooperative engagement with the respective retention members of the center section to prevent the disengagement of the telescoping members from the center section.

4. A collapsible animal gambrel as claimed in claim 2, wherein a portion of the interior wall surface of the hollow center section at each distal end thereof has a retention member mounted to the interior wall surface, each proximal end of each of the telescoping end sections have a stop member mounted to the exterior wall surface thereof for cooperative engagement with the respective retention members of the center section to prevent the disengagement of the telescoping members from the center section.

5. A collapsible animal gambrel as claimed in claim 4, wherein the distal end of each of the first and second telescoping end sections have a hook attached thereto.

6. A collapsible animal gambrel as claimed in claim 5, wherein the hook has a shape substantially in the form of a J.

7. A collapsible animal gambrel as claimed in claim 5, wherein the hook has a shape substantially in the form of a V.

8. A collapsible animal gambrel as claimed in claim 5, wherein a hanger mechanism is centrally mounted to the exterior wall of the center section.

* * * * *